Figure 1:
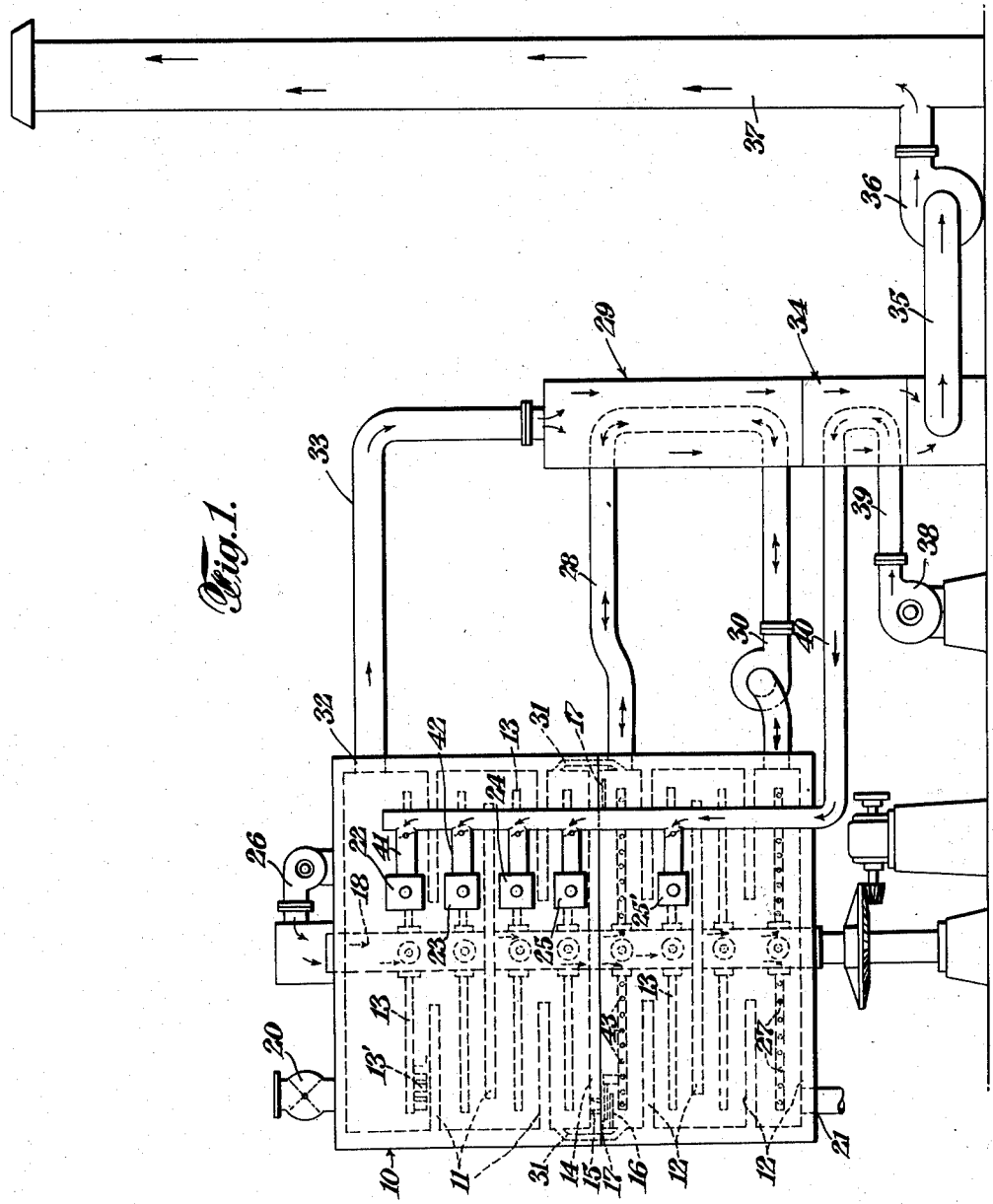

May 3, 1938. G. E. CONNOLLY 2,116,058
DRYING AND INCINERATION OF COMBUSTIBLE MATERIAL
Filed Oct. 22, 1936 2 Sheets-Sheet 2
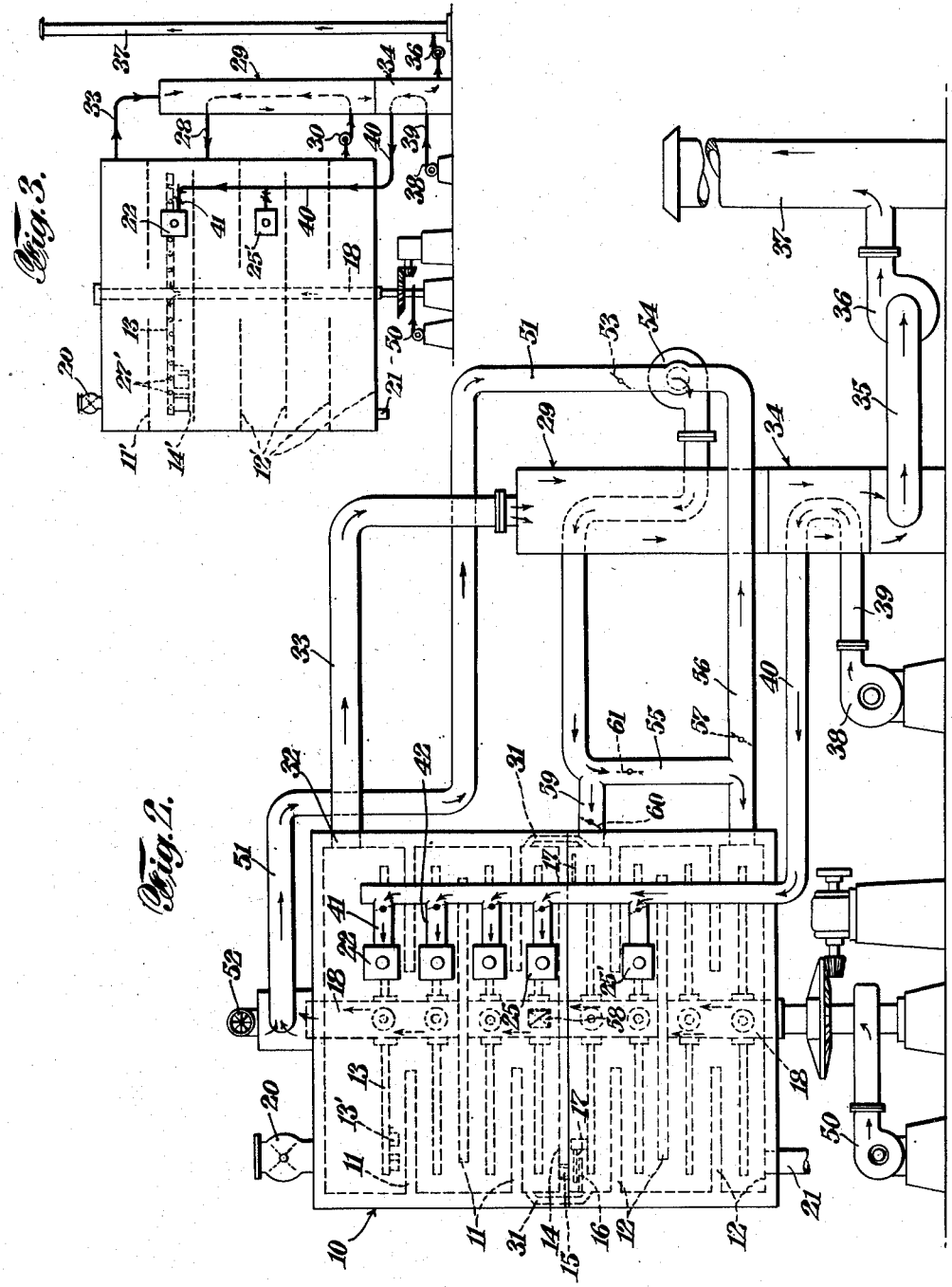
INVENTOR
*George E. Connolly*
BY
*Ward, Crosby & Neal*
ATTORNEYS Patented May 3, 1938

2,116,058

UNITED STATES PATENT OFFICE 2,116,058

DRYING AND INCINERATION OF COMBUSTIBLE MATERIAL

George E. Connolly, Oakland, Calif., assignor to Nichols Engineering & Research Corporation, New York, N. Y., a corporation of Delaware Application October 22, 1936, Serial No. 106,944

20 Claims. (Cl. 110—12)

This invention relates to the dehydration or drying and also the burning of moist materials, such for example as waste materials of the nature of sewage sludge or the like.

An important phase of the invention relates to a furnace adapted for drying sewage sludge or the like to such an extent that it will have a very low moisture content, but without danger of scorching or burning the material. Thus the dried product is left in a desirable condition for use as fertilizer. A preferred example of my invention involves a furnace having one or more drying zones wherein the material to be treated is subjected to a relatively high temperature as by the burning of fuel, such zone or zones being superimposed over another drying zone or zones of a lower temperature wherein the material is further dried without danger of scorching, the drying action in the latter zone or zones being expedited and rendered more thorough by the recirculation of hot air and/or vapor over the drying material.

According to another phase of the invention, a furnace construction adapted for the above indicated purposes is provided in such manner that if desired, the furnace may be quickly and easily converted into an apparatus for both drying and incinerating the moist material, or quickly restored to operate merely as a drier. Thus with the same apparatus a normal supply of waste material may be dried for meeting a predetermined demand for fertilizer material and when at times the supply of waste material becomes excessive, the excess may be incinerated.

Various further and more specific features, objects and advantages will clearly appear from the detailed description given below, taken in connection with the accompanying drawings which form a part of this specification and illustrate, merely by way of example, various embodiments of the apparatus of the invention.

The invention consists in such novel features, arrangements and combinations of parts as may be shown and described in connection with the furnace arrangements herein disclosed, by way of example only, and as illustrative of preferred embodiments, together with such novel methods and steps of processes as may also be described herein.

In the drawings, Fig. 1 illustrates somewhat diagrammatically one embodiment of the invention;

Fig. 2 similarly illustrates another desirable embodiment of the invention; and

Fig. 3 illustrates a further modification of the apparatus of Fig. 1.

Referring to Fig. 1, the apparatus there shown may comprise a furnace 10 having a plurality of superposed hearths as at 11 mounted within the upper portion of the furnace wherein the material being dried is subjected to a relatively high temperature, and also a plurality of superposed hearths as at 12 within the lower portion of the furnace, wherein the completion of the drying process is carried out preferably at a somewhat lower temperature. A plurality of rabble arms as at 13 may be provided at each hearth, these arms each being in turn provided with teeth as at 13', whereby the material being treated on the several hearths will be distributed over each hearth as a relatively thin substantially horizontal layer which will be periodically rabbled and gradually advanced over each hearth and through drop holes to the hearth below.

The hearths and the drop holes thereof, as well as a cylindrical outer furnace wall for supporting the hearths, may be generally similar to the corresponding parts of the furnace construction shown in the patent to Dudley Baird and Robert W. Rowen, No. 2,015,050, granted September 17, 1935, except for the features hereinafter described.

One of the hearths, for example a hearth 14 at the mid portion of the furnace, may be made without the drop holes of the usual form in order to separate to a certain extent the upper high temperature zones of the furnace from the lower zones which are preferably maintained at a lower temperature. This separation of the lower zones also enables a rapid recirculation of air and vapor through the lower zones independently of the upper zones for purposes hereinafter more fully explained. Hearth 14 may be formed with one or more drop holes as at 15 so constructed as to permit the material being treated to pass therethrough at a predetermined rate without, however, permitting any substantial amount of air, gases or vapor to pass therethrough. One form of construction suitable for this purpose is disclosed in the patent to Henry J. Hartley, No. 1,768,465, granted June 24, 1930, such construction being used in said patent as a multiple hearth furnace inlet feeding device. As here indicated in Fig. 1, this construction may include a shelf member as at 16 mounted beneath each of the drop holes 15, whereby a pile of the material being treated will accumulate on such shelf to an extent sufficient to block the drop holes against passage of gases therethrough. In order to periodically feed the material from the shelf at a predetermined rate, one or more of the rabble arms just below hearth 14 may be provided with a feeding arm or scoop as at 17. The rabble arms may all be mounted upon a rotatable central shaft as at 18 in a manner similar to the rabble construction of said Patent 2,015,050. Thus with each revolution of a rabble arm carrying a feeding arm as at 17, a predetermined quantity of the material on shelf 16 will be thrust off the shelf to the hearth below, but ordinarily sufficient material will remain on the shelf to more or less seal the drop hole as at 15, at least to an extent sufficient to prevent any rush of air or gases therethrough, which might cause very dry particles from the lower part of the furnace to be entrained and carried up into the upper part of the furnace and thus start unintended ignition of the waste material.

The material to be treated may be initially fed into the furnace through a suitable feeding device as at 20, adapted to substantially continuously feed materials such as sewage sludge, into the furnace without any substantial escape of gases or vapor from the furnace at this point. The material after being rabbled in succession over the superposed hearths and down through the furnace, may finally pass out through an exit opening as at 21 at the bottom of the furnace.

The desired high temperatures within the upper part of the furnace may be maintained as by the use of oil or gas burners as indicated at 22 to 25 inclusive. Since the material being treated is quite moist at these upper hearths, the initial drying action may be carried on at these hearths without danger of scorching or burning the material, notwithstanding the presence of the burners.

A supply of air may be forced into the lower part of the furnace as by a blower or fan 26, so connected as to force air into the upper end of the rotatable central shaft 18. This shaft as well as the rabble arms mounted thereon, may be formed with communicating cooling air passages of a construction generally similar to that shown in said Patent 2,015,050, so that the supply of air is forced through the rabble arm and shaft cavities and thereby becomes heated while preventing the rabble arms from being subjected to destructive temperatures. The air thus preheated may be discharged through a series of small air outlets as at 27 formed, for example, in the rabble arms which are located at the lowermost hearth of the furnace. Thus a supply of preheated air is made available within the bottom of the furnace and this air together with vapor evolved from the drying material, may rise from hearth to hearth and over the material on each hearth to the space above the upper hearth 12. At this point such air and vapor may be withdrawn through a conduit 28 and passed through a recuperator 29 hereinafter referred to in further detail. Within this recuperator the air and vapor from conduit 28 may become further heated or reheated and may be forced by a fan 30 through suitable connections as shown, back into the furnace, for example at the lowermost hearth, for recirculation through the lower zones of the furnace. In this manner a relatively strong current of recirculating hot air and vapor is provided throughout the lower section of the furnace.

As soon as sufficient vapor is evolved from the drying material in the lower section of the furnace to provide a quantity of air and vapor in excess of what may be readily recirculated by the fan 30, such an excess may be conducted through one or more relatively restricted cavities as at 31 into the upper part of the furnace. At the same time, since the lower section of the furnace is in communication with the upper section only through the relatively restricted cavities 31, the lower section may be maintained with an atmosphere having a considerable percentage of hot vapor, tending to prevent combustion of the drier material in this section.

Such vapor as is conducted through the cavities 31 into the upper section of the furnace may rise over the material on the several upper hearths in succession and past the high temperature regions where fuel is being burned. Accordingly any odoriferous components of such vapor or of the vapor evolved in the upper section of the furnace, will be subjected to a sufficient temperature in the presence of the burners to destroy the obnoxious odors thereof. Finally, the remaining air which is not used for fuel combustion, together with the vapor and evolved gaseous products of fuel combustion, may be passed out from the space above the upper hearth through an exit opening as at 32. This relatively hot stream of gases, vapor and air may then be conducted as by a conduit 33 into the recuperator 29 in heat exchanging relationship with the air and vapor being recirculated through the lower furnace section.

From the recuperator 29 the exit gases and vapor may be conducted through a second recuperator 34 and thence through a conduit 35, a suction fan 36, to a stack or the equivalent, as at 37.

Within recuperator 34 the hot exit gases and vapor may be brought into heat exchanging relationship with a supply of air for use at the furnace burners. That is, a blower as at 38 may be used to force this air supply through a conduit 39, through recuperator 34, a conduit 40, and branch conduits as at 41, 42, etc., to the several burners 22 to 25 inclusive. The proportion of this supply of preheated air which is fed to each burner may be adjusted as by dampers, as indicated in conduits 41, 42, etc., so that each burner will have a sufficient supply of hot air for economically burning the fuel supply thereto.

If desired also an additional burner 25' may be provided at one of the hearths in the lower section of the furnace and supplied with preheated air as shown, in a manner similar to the other burners. It will be usually unnecessary to operate the burner 25' except when bringing the furnace up to normal temperature or when it is desired to treat material having an unusually large water content.

In the operation of the apparatus as above described, the vapor and air within the lower section of the furnace are recirculated in a direction to cause an upward draft through this section. If desired, however, the operation of the fan 30 may be reversed so as to cause the vapor and air within the lower section of the furnace to flow downwardly from hearth to hearth and out through fan 30. In that event, the preheated air from the rabbling system may be preferably introduced through openings as at 43 formed in the rabble arms just above the upper hearth 12. The rabble arm openings 27 and 43 may be alternatively opened or closed as by the use of mechanism disclosed in the patent to Henry J. Hartley, et al., No. 1,842,782, granted January 26, 1932. Thus, for example, the lower hearth 12 may be subjected to streams of preheated air from the rabble system while the upper hearth 12 is supplied with preheated air and vapor from the recuperator 29, or if the recirculating system is reversed, then the upper hearth 12 may be provided with preheated air from the rabbling structure and the lower hearth 12 with recirculated heated air and vapor. In either case, an efficient and intense drying action is made possible on all of the lower hearths of the furnace under conditions unfavorable for combustion, so that the material may be thoroughly dried without danger of burning or scorching.

Thus supplies of sewage sludge filter cake, for example, may be fed into the upper part of the furnace with a moisture content in the neighborhood of from 75 to 90%. The temperatures to which this wet material may be subjected in the upper part of the furnace, may be safely made quite high without danger of burning, and then as the partially dried material is fed into the lower section of the furnace, the intense drying action made available by the recirculation of hot air and vapor, enables the moisture content of the material to be reduced to in the neighborhood of 10%, for example, before it is discharged from the outlet 21.

In Fig. 2 apparatus is illustrated having many features in common with that of Fig. 1, corresponding parts being identified by the same reference numerals. However, the apparatus of Fig. 2 is so arranged that it may quickly be transformed from a drier into an arrangement for drying and also incinerating the sewage sludge or other moist material being treated. In Fig. 2 the air is supplied to the furnace by a blower 50, into the base of the central furnace shaft 18, as in said Patent 2,015,050, and if the equipment is to be used as a drier and incinerator, this air passes through the cooling cavities of the rabble structure, the air thereby being heated and being drawn off through the top of shaft 18 into a conduit 51. Also if desired, additional air may be drawn into the conduit 51 through a butterfly air intake valve as at 52. The resulting supply of preheated air in conduit 51 may be conducted past a damper as at 53 and forced as by blower 54 through recuperator 29 in heat exchanging relationship with exit gases from the furnace, and thence through a conduit as at 55 into the bottom of the furnace.

The blower 54 in addition to being connected to the conduit 51, may also have an intake conduit 56 communicating with the space above the lower hearth 12, but when the apparatus is to be used as an incinerator, a damper as at 57 in conduit 56 will normally be kept closed or nearly closed. In that event the operation of the equipment will be similar in many respects to that of the operation of the incinerating equipment in said Patent 2,015,050. However, it will be noted that heat of the exit gases from the furnace is efficiently absorbed and recovered in two stages through the use of the two heat exchanging devices 29 and 34.

When, however, it is desired to operate the apparatus as a drier without burning the material being treated, damper 53 may be closed and instead a supply of preheated air from the rabbling system may be admitted into the furnace, at a point above hearth 14 for example, through a damper opening as at 58—the opening 58 being either closed or partially closed while the apparatus is being used as an incinerator. Also when the apparatus is being used as a drier, the damper 57 may be opened so that vapor may be withdrawn from the lower part of the furnace through conduit 56 by fan 54, this vapor then passing through the recuperator 29 in heat exchanging relationship with the furnace exit gases and vapor. Thus the vapor withdrawn from the lower part of the furnace will be heated or further reheated, and then it will be forced by the blower 54 through a conduit as at 59 into the furnace at a point just below hearth 14. The conduit 59 may be provided with a damper 60 which may be left open when the furnace is used as a drier, but is preferably closed or partially closed when the furnace is used as an incinerator. The conduit 55 may also be provided with a damper 61 which may be left open when the furnace is used as an incinerator and closed when it is used as a drier. Thus, when the furnace is used as a drier, and with burner 25' not operating, the fan 57 will serve to maintain a recirculating stream of vapor over the drying hearths 12, whereby such stream will pass over the material on each of these hearths in succession downwardly through the furnace, the stream being maintained in heated condition by reason of its passage through recuperator 29. With this arrangement, therefore, when the furnace is used merely to dry the material, an atmosphere may be maintained within the lower section of the furnace substantially wholly comprising vapor evolved from the drying material, thereby precluding combustion within this portion of the furnace, even though the material may be very dry as it leaves the bottom hearth.

If sewage sludge is to be dried or burned in the above described apparatus, it may first be preferably treated so as to eliminate a considerable portion of the water content, for example by any well-known mechanical dehydrating process. The apparatus is particularly adapted for the drying or burning of sewage sludge which has been passed through a rotary vacuum drum filter, so that the material is introduced into the furnace in the form of relatively thin chunks of filter cake which crumble into finely divided form on being rabbled and dried in the apparatus. The apparatus is also adaptable for the treatment of garbage, particularly after the same has been suitably ground, or for garbage mixed with sewage sludge or other waste material. The material as introduced into the apparatus may have a water content as high as from 75% to 90% and still be quite thoroughly dried or dried and incinerated.

Fig. 3 schematically illustrates a modification of the apparatus of Fig. 1, similar parts being identified by the same reference numerals. In Fig. 3, however, the invention is illustrated as applied to a multiple hearth furnace having six hearths including upper hearths 11' and 14' for heating and preliminarily drying the moist material, and hearths 12' for completing the drying operation. Instead of introducing the preheated air from the rabbling structure into the lower section of the furnace as in Fig. 1, this air according to the arrangement of Fig. 3, is introduced into the upper section of the furnace through rabble arm apertures as at 27'. Thus, in Fig. 3, the lower section of the furnace comprising the hearths 12', is arranged to be maintained with a recirculating hot atmosphere substantially wholly consisting of vapor evolved from the material as it dries within the lower section of the furnace, this vapor being recirculated in the same manner as with the arrangement of Fig. 1. The cavities 31 as shown in Figs. 1 and 2, are omitted at hearth 14' as shown in Fig. 3 and instead the hearth 14 may be formed with small drop holes of the conventional type. The cooling air for the rabbling structure in Fig. 3 may be conveniently introduced by a fan 50 at the bottom of the shaft 18 as in Fig. 2.

With the arrangement of Fig. 3, as in the case of Fig. 1, the vapor may be recirculated within the lower section of the furnace in either direction by the fan 30, although it is preferable particularly where the material is finally dried to a high degree, to recirculate this vapor in a direction to cause a downdraft in the lower section of the furnace so that the hottest vapor will pass over the material while it is relatively more moist and before the material reaches a highly combustible dry condition at the lowermost hearth or hearths.

In Fig. 3 for simplicity of illustration, rabble arms 13 are shown only at one of the hearths, although it will be understood that rabble arms and accompanying teeth are to be provided at all of the hearths as in the other two figures.

While in the particular examples of the invention shown, several hearths are provided within both the upper and lower sections of the furnace, it will be understood that under some circumstances if desired, only a single hearth need be provided in each furnace section. In that event the hearth of each section is made of sufficient area to accommodate the quantity of material being treated.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent of the United States is:

1. A furnace for drying moist material, comprising a plurality of superposed hearths, means for introducing the material on to an upper hearth, means for rabbling the material on each hearth while gradually advancing the same over each hearth and from hearth to hearth down through the furnace, means for burning fuel within the upper portion of the furnace for heating such portion to a relatively high temperature to preliminarily heat and dry the moist material, means for recirculating a stream of air together with vapor evolved from the drying material, through the lower portion of the furnace, and means for heating said recirculating stream, thereby heating said lower portion of the furnace, but to a temperature relatively lower than in said upper portion, and insufficient to cause scorching or burning of the material.

2. A furnace for drying moist material, comprising a plurality of superposed hearths, means for introducing the material on to an upper hearth, means for rabbling the material on each hearth while gradually advancing the same over each hearth and from hearth to hearth down through the furnace, means for burning fuel within the upper portion of the furnace for heating such portion to preliminarily heat and dry the material, and means for recirculating a stream of hot vapor evolved from the drying material through a lower portion of the furnace, whereby the material is further dried in an atmosphere preventing combustion, within said lower portion of the furnace.

3. A furnace for drying moist material, comprising a plurality of superposed hearths, means for introducing the material on to an upper hearth, means for rabbling the material on each hearth while gradually advancing the same over each hearth and from hearth to hearth down through the furnace, means for burning fuel within the upper portion of the furnace for heating such portion to preliminarily heat and dry the material, means for recirculating a stream of vapor evolved from the drying material through a lower portion of the furnace, and means for utilizing heat of the gases and vapor evolved within the upper portion of the furnace for heating said recirculated stream of vapor for said lower portion of the furnace.

4. A furnace for drying moist material, comprising a plurality of superposed hearths, means for introducing the material on to an upper hearth, means for rabbling the material on each hearth while gradually advancing the same over each hearth and from hearth to hearth down through the furnace, means for burning fuel within the upper portion of the furnace for heating such portion to preliminarily heat and dry the material, means for recirculating a stream of hot vapor evolved from the drying material through a lower portion of the furnace, whereby the material is further dried in an atmosphere unfavorable for combustion, within said lower portion of the furnace, and means for conducting limited portions of said recirculating stream from said lower portion of the furnace into said upper portion thereof.

5. Furnace apparatus for drying wet waste material without burning or scorching the same, comprising a plurality of superposed hearths, means for rabbling the material on each hearth while gradually advancing the same over each hearth and downwardly from hearth to hearth, means for heating the upper portion of the furnace to heat and preliminarily dry the material therein, said rabbling means being formed with internal cooling conduits, means for causing a stream of air to pass through said conduits whereby such air is heated, said rabbling means being also formed with air discharge outlets within the furnace for discharging said heated air on to the drying material within the furnace, means for withdrawing a stream of vapor from the lower portion of the furnace and reintroducing the same at another point in the lower portion of the furnace whereby a recirculating vapor stream is established in said lower portion, and means for withdrawing hot vapor evolved from the drying material from the upper portion of the furnace, and a heat exchanging device with connections for utilizing the heat of said withdrawn hot vapor to heat said recirculating stream for the lower portion of the furnace.

6. Furnace apparatus for drying wet waste material without burning or scorching the same, comprising a plurality of superposed hearths, means for rabbling the material on each hearth while gradually advancing the same over each hearth and from hearth to hearth down through the furnace, said hearths being provided with discharge ports permitting the material to fall from hearth to hearth, means for introducing preheated air into the upper portion of the furnace and for burning fuel therein for heating such portion to a relatively high temperature to heat and preliminarily dry the moist material, the lower portion of the furnace being closed against the entrance of any substantial amount of air thereto, and means for heating the atmosphere of vapor evolved from the drying material within the lower portion of the furnace whereby the material is further dried in said lower portion in an atmosphere unfavorable for combustion.

7. Apparatus for drying moist material comprising a furnace having a plurality of superposed hearths, means for rabbling the material on each hearth while gradually advancing the same over each hearth and from hearth to hearth down through the furnace, the hearths being provided with or accompanied by ports or passages permitting a stream of vapor evolved from the drying material to pass over the material on the lower hearths and then over the material on the upper hearths, means for burning fuel within the upper portion of the furnace adjacent the more moist material, means for withdrawing hot vapor and gaseous products of combustion from the upper portion of the furnace, means for recovering heat from said withdrawn vapor and gaseous products in two successive stages comprising a heat exchanging device and connections for first transferring a portion of such heat to the stream of vapor passing over the drying material in the lower portion of the furnace, and a second heat exchanging device with connections for transferring remaining useful heat of said withdrawn vapor and gaseous products to a stream of intake air introduced into the furnace adjacent said fuel burning means to provide preheated air for supporting combustion of the fuel.

8. A furnace for drying moist material comprising a plurality of superposed hearths, means for rabbling the material over each hearth and from hearth to hearth down through the furnace, means for heating the material in the upper portion of the furnace to preliminarily dry the same, means for recirculating in a direction along the path of travel of the material and over the material on the lower hearth or hearths a stream of vapor evolved from the drying material at said lower hearth or hearths for more thoroughly drying the material in an atmosphere of hot vapor unfavorable for combustion, and means for heating said recirculating stream at a point after removal of the stream from the driest material on said lower hearth or hearths and before the stream is reintroduced over relatively more moist material on said lower hearth or hearths.

9. The method of drying moist combustible material substantially without scorching or burning the same, which comprises passing the material in succession through a plurality of heated zones, the material being periodically agitated and gradually advanced through each zone and from zone to zone, burning fuel within the initial zone or zones to quickly heat and preliminarily dry the moist material in said initial zone or zones, more thoroughly drying the material in the subsequent zone or zones in the presence of an atmosphere unfavorable to combustion, a large part of said atmosphere comprising a stream of hot vapor withdrawn from one of the zones and introduced into a subsequent zone or zones, and utilizing heat derived from the combustion of fuel in said initial zone or zones to heat said vapor introduced into said subsequent zone or zones.

10. The method of drying moist waste material, which comprises passing the material in succession through a plurality of heated zones, the material being periodically agitated and gradually advanced through each zone and from zone to zone, burning fuel within the initial zone or zones to quickly heat and preliminarily dry the moist material in said initial zone or zones, and more thoroughly drying the material in the subsequent zone or zones in the presence of an atmosphere unfavorable to combustion, a large part of said atmosphere comprising a stream of hot vapor which has been withdrawn from a zone where fuel is burned and introduced into a subsequent zone or zones.

11. The method of drying moist combustible material substantially without scorching or burning the same, which comprises passing the material in succession through a plurality of heated zones, the material being periodically agitated and gradually advanced through each zone and from zone to zone, burning fuel within the initial zone or zones to quickly heat and preliminarily dry the material in said initial zone or zones, more thoroughly drying the material in the subsequent zone or zones in the presence of an atmosphere unfavorable to combustion, a large part of said atmosphere comprising hot vapor which has been withdrawn from one of the zones and introduced into a subsequent zone or zones, utilizing heat derived from the combustion of fuel in said initial zone or zones to heat said vapor introduced into said subsequent zone or zones, and conducting vapor from said subsequent zone or zones into said initial zone or zones.

12. A furnace for drying moist combustible material, comprising a plurality of superposed hearths, means for rabbling the material over each hearth and from hearth to hearth down through the furnace, the hearths being provided with ports arranged to permit the material to fall from hearth to hearth and to permit gases and vapor to pass upwardly from hearth to hearth, means for burning fuel within the upper portion of the furnace to quickly heat and preliminarily dry the moist material, means for maintaining within the lower portion of the furnace a hot atmosphere unfavorable to combustion for more thoroughly drying the material, said last named means including conduits for withdrawing heated vapor from the furnace at one of the hearths and for reintroducing such vapor into a lower portion of the furnace.

13. Apparatus for drying waste material, and also for drying and burning the material, comprising a furnace having a plurality of superposed hearths, means for rabbling the material over each hearth and from hearth to hearth down through the furnace, the hearths being accompanied by passages permitting a stream of gases or vapor evolved from the material to pass over the lower hearths of the furnace and then over the upper hearths thereof, means for withdrawing said stream from the upper portion of the furnace, means for recovering heat from said withdrawn stream comprising a heat exchanging device, connections for said device for transferring such heat to a stream of intake air for supporting combustion within the furnace when the apparatus is used to burn the material, said connections being adjustable for transferring such heat to the vapor stream flowing over the lower hearths of the furnace when the apparatus is used for drying the material without burning thereof, and means operatively associated with said connections for recirculating said last mentioned vapor over said lower hearths when the apparatus is used for drying without burning.

14. Apparatus for drying waste material, and also for drying and burning the material, comprising a furnace having a plurality of superposed hearths, means for rabbling the material over each hearth and from hearth to hearth down through the furnace, the hearths being accompanied by passages permitting a stream of gases or vapor evolved from the material to pass over the lower hearths of the furnace and then over the upper hearths thereof, means for withdrawing said stream from the upper portion of the furnace, means for recovering heat from said withdrawn stream comprising a heat exchanging device, connections for said device for transferring such heat to a stream of intake air for supporting combustion within the furnace when the apparatus is used to burn the material, said connections being adjustable for transferring such heat to the vapor stream flowing over the lower hearths of the furnace when the apparatus is used for drying the material without burning thereof, said rabbling means being formed with cooling conduits, means for causing a stream of air to flow through such conduits whereby such air is heated, and means for conducting such heated air to said heat exchanging device to provide a source of said intake air to be further heated in said device when the apparatus is used for burning the material, and means for discharging the air heated in said cooling conduits directly into the furnace when the apparatus is used for drying the material without burning thereof.

15. The method of drying moist finely divided material which is combustible when partially dried, and effecting such drying substantially without scorching or burning the material, which comprises passing the material in succession through a plurality of heated zones, the material being periodically agitated and gradually advanced through each zone and from zone to zone, the moist material being heated and preliminarily dried in the first zone or zones by burning fuel therein, and more thoroughly drying the material without combustion in the succeeding zone or zones, by maintaining in said latter zone or zones a recirculating hot atmosphere the greater part of which comprises vapor evolved from the material in said latter zone or zones, the vapor in said atmosphere being sufficient in amount to preclude combustion in said latter zone or zones.

16. The method of drying moist waste material substantially without scorching or burning the same, which comprises passing the material in succession through a plurality of heated zones, the material being periodically agitated and gradually advanced through each zone and from zone to zone, the moist material being heated and preliminarily dried in the first zone or zones by burning fuel therein, more thoroughly drying the material without combustion in the succeeding zone or zones, by maintaining in said latter zone or zones a recirculating hot atmosphere having a large content of vapor evolved from the material drying in said latter zone or zones, and utilizing heat of the vapor and gases evolved in said first zone or zones to heat said recirculating atmosphere.

17. The method of drying moist finely divided material which is combustible when partially dried, and effecting such drying substantially without scorching or burning the material, which comprises passing the material in succession through a plurality of heated zones, the material being periodically agitated and gradually advanced through each zone and from zone to zone, the moist material being heated and preliminarily dried in the first zone or zones by burning fuel therein, more thoroughly drying the material without combustion in the succeeding zone or zones, by maintaining in said latter zone or zones a recirculating heated atmosphere including sufficient vapor evolved from the drying material in said latter zone or zones to preclude combustion of the material therein, and withdrawing from the latter zone or zones through the first zone or zones where fuel is burned, the vapor produced in the latter zone or zones in excess of the quantity recirculated therethrough.

18. The method of drying moist waste material substantially without scorching or burning the same, which comprises passing the material in succession through a plurality of heated zones, the material being periodically agitated and gradually advanced through each zone and from zone to zone, the moist material being heated and preliminarily dried in the first zone or zones by burning fuel therein, more thoroughly drying the material in the succeeding zone or zones without burning the material by maintaining in said latter zone or zones a recirculating heated atmosphere including sufficient vapor evolved from the drying material in said latter zone or zones to preclude combustion of the material therein, withdrawing from the latter zone or zones through a prior zone where fuel is burned, the vapor produced in the latter zone or zones in excess of the quantity recirculated therethrough, and utilizing heat available from the gases and vapor of the first zone or zones for heating said recirculating atmosphere.

19. Furnace apparatus for drying finely divided moist material without burning or scorching the same, comprising a plurality of superposed hearths, means for rabbling the material over each hearth and from hearth to hearth down through the furnace, means for burning fuel in the presence of the moist material in the upper portion of the furnace, means for withdrawing a stream of vapor from a lower portion of the furnace, and means for heating said withdrawn stream and reintroducing the same at another point in the lower portion of the furnace whereby a recirculating stream of hot vapor is established in said lower portion and whereby a hot atmosphere is maintained therein having a sufficiently high proportion of vapor evolved from the drying material as to prevent combustion.

20. Furnace apparatus for drying finely divided moist material without burning or scorching the same, comprising a plurality of superposed hearths, means for rabbling the material over each hearth and from hearth to hearth down through the furnace, means for burning fuel in the presence of the moist material in the upper portion of the furnace, means for withdrawing a stream of vapor from a lower portion of the furnace, means for heating said withdrawn stream and reintroducing the same at another point in the lower portion of the furnace whereby a recirculating stream of hot vapor is established in said lower portion and whereby a hot atmosphere is maintained therein having a sufficiently high proportion of vapor evolved from the drying material as to prevent combustion, and means for withdrawing from the upper portion of the furnace the vapor evolved within said upper portion together with vapor leaving said recirculating stream and passing from the lower portion into said upper portion.

GEORGE E. CONNOLLY.